(12) United States Patent
Melodia et al.

(10) Patent No.: US 11,239,963 B2
(45) Date of Patent: Feb. 1, 2022

(54) ULTRASONIC MULTIPLEXING NETWORK FOR IMPLANTABLE MEDICAL DEVICES

(71) Applicant: Northeastern University, Boston, MA (US)

(72) Inventors: Tommaso Melodia, Newton, MA (US); Giuseppe Enrico Santagati, Cambridge, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 17/034,217

(22) Filed: Sep. 28, 2020

(65) Prior Publication Data

US 2021/0266122 A1 Aug. 26, 2021

Related U.S. Application Data

(63) Continuation of application No. 16/552,369, filed on Aug. 27, 2019, now Pat. No. 10,790,946, which is a
(Continued)

(51) Int. Cl.
*H04K 1/10* (2006.01)
*H04L 5/00* (2006.01)
(Continued)

(52) U.S. Cl.
CPC ............ *H04L 5/0012* (2013.01); *H04B 11/00* (2013.01); *H04B 13/005* (2013.01);
(Continued)

(58) Field of Classification Search
CPC ... H04L 5/0012; H04L 1/0003; H04L 1/0009; H04L 27/0008; H04L 27/2602;
(Continued)

(56) References Cited

U.S. PATENT DOCUMENTS

| 5,861,018 | A | 1/1999 | Feierbach |
| 7,512,448 | B2 | 3/2009 | Malick et al. |

(Continued)

FOREIGN PATENT DOCUMENTS

| EP | 1115221 A1 | 7/2001 |
| EP | 1924027 A2 | 5/2008 |

(Continued)

OTHER PUBLICATIONS

Galluccio et al., "Challenges and Implications of Using Ultrasonic Communications in Infra-body Area Networks", in Proc. of IEEE Intl. Conf. on Wireless On-demand Networked Systems (WONS), Courmayeur, Italy, Jan. 2012, pp. 182-189.
(Continued)

*Primary Examiner* — Helene E Tayong
(74) *Attorney, Agent, or Firm* — Verrill Dana, LLP

(57) ABSTRACT

A system and method for transmitting data ultrasonically through biological tissue employs a network of a plurality of nodes, at least a portion of the nodes implantable within the biological tissue. At least one implanted node includes a transmitter having an orthogonal frequency division multiplex signal generator to encode an ultrasonic signal for transmission through the biological tissue to an ultrasonic receiver at another node.

2 Claims, 6 Drawing Sheets

Related U.S. Application Data continuation of application No. 15/622,492, filed on Jun. 14, 2017, now Pat. No. 10,396,948, which is a continuation-in-part of application No. PCT/US2016/012439, filed on Jan. 7, 2016.

(60) Provisional application No. 62/349,711, filed on Jun. 14, 2016, provisional application No. 62/100,628, filed on Jan. 7, 2015.

(51) Int. Cl.
| | |
|---|---|
| H04B 13/00 | (2006.01) |
| H04B 11/00 | (2006.01) |
| H04L 1/00 | (2006.01) |
| H04L 27/00 | (2006.01) |
| H04L 27/26 | (2006.01) |
| H04L 27/20 | (2006.01) |
| H04L 27/36 | (2006.01) |

(52) U.S. Cl.
CPC .......... *H04L 1/0003* (2013.01); *H04L 1/0009* (2013.01); *H04L 1/0057* (2013.01); *H04L 27/0008* (2013.01); *H04L 27/2602* (2013.01); *H04L 27/2626* (2013.01); *H04L 27/2053* (2013.01); *H04L 27/362* (2013.01)

(58) Field of Classification Search
CPC ............... H04L 27/2626; H04L 1/0057; H04L 27/2053; H04L 27/362; H04B 13/005; H04B 11/00
USPC ......................................................... 375/260
See application file for complete search history.

(56) References Cited

U.S. PATENT DOCUMENTS

| | | | |
|---|---|---|---|
| 7,570,998 | B2 | 8/2009 | Zhang et al. |
| 8,165,236 | B2 | 4/2012 | Hyoung et al. |
| 8,401,659 | B2 | 3/2013 | Von Arx et al. |
| 8,626,295 | B2 | 1/2014 | Doron et al. |
| 2002/0141479 | A1 | 10/2002 | Garcia-Luna-Aceves et al. |
| 2004/0202339 | A1* | 10/2004 | O'Brien, Jr. ......... H04B 13/005 381/312 |
| 2006/0008275 | A1* | 1/2006 | Lacovara ............... H04B 13/00 398/140 |
| 2007/0238482 | A1 | 10/2007 | Rayzman et al. |
| 2010/0080265 | A1 | 4/2010 | Moffatt et al. |
| 2010/0280379 | A1 | 11/2010 | Satoh |
| 2011/0077715 | A1 | 3/2011 | Rofougaran |
| 2011/0130092 | A1 | 6/2011 | Yun |
| 2012/0134423 | A1 | 5/2012 | Zhou et al. |
| 2012/0171963 | A1 | 7/2012 | Tsfaty |
| 2013/0033966 | A1 | 2/2013 | Boon et al. |
| 2014/0016558 | A1 | 1/2014 | Lawry et al. |
| 2014/0269396 | A1 | 9/2014 | Li et al. |
| 2014/0363166 | A1* | 12/2014 | Lacovara ............... H04B 10/80 398/104 |

FOREIGN PATENT DOCUMENTS

| | | |
|---|---|---|
| EP | 0853400 B1 | 2/2010 |
| WO | 2015048815 A1 | 4/2015 |
| WO | 2015048820 A1 | 4/2015 |

OTHER PUBLICATIONS

Santagati et al., "Ultrasonic networking for e-health applications", IEEE Wireless Communications, vol. 20, No. 4, pp. 74-81, 2013.
Santagati et al., "Medium access control and rate adaptation for ultrasonic infra body sensor networks," IEEE/ACM Transactions on Networking, vol. 23, pp. 1121-1134, Aug. 2015.
Santagati et al., "Sonar Inside Your Body: Prototyping Ultrasonic Intra-body Sensor Networks," in Proc. of IEEE Conf. on Computer Communications (INFOCOM), Toronto, Canada, Apr. 2014, pp. 1-9.
Melodia et al., "Advances in underwater acoustic networking," in Mobile Ad Hoc Networking: Cutting Edge Directions, S. Basagni, M. Conti, S. Giordano, and I. Stojmenovic, Eds. Hoboken, NJ: John Wiley & Sons, Inc., 2013, npp. 804-854.
Demirors et al., "Design of A Software-defined Underwater Acoustic Modem with Real-time Physical Layer Adaptation Capabilities," in Proc. of ACM Intl. Conf. on Underwater Networks & Systems (WUWNet), Rome, Italy, Nov. 2014, pp. 1-8.
Demirors et al., "SEANet: A Software-Defined Acoustic Networking Framework for Reconfigurable Underwater Networking," in Proc. of ACM Intl. Conf. on Underwater Networks & Systems (WUWNet), Washington, DC, Nov. 2015, pp. 1-8.
Demirors et al., "Software-defined underwater acoustic networks: Toward a high-rate real-time reconfigurable modem," IEEE Communications Magazine, vol. 53, No. 11, pp. 64-71, Nov. 2015.
Chowdhury et al., "Platforms and testbeds for experimental evaluation of cognitive ad hoc networks," IEEE Communications Magazine, vol. 48, No. 9, pp. 96-104, Sep. 2010.
Demirors et al., "RcUBe: Real-time reconfigurable radio framework with self-optimization capabilitites," in Proc. of IEEE Intl. Conf. on Sensing, Communication, and Networking (SECON), Seattle, WA, Jun. 2015, pp. 1-9.
G. Santagati, and T. Melodia, "Opto-ultrasonic communications in wireless body area nanonetworks". 2013 Asilomar Conference on Signals, Systems and Computers, Nov. 3-6, 2013.
G. Santagati et al., "Distributed MAC and rate adaptation for ultrasonically networked implantable sensors". Sensor, Mesh and Ad Hoc Communications and Networks (SECON), 2013 10th Annual IEEE Communications Society Conference, Jun. 24-27, 2013.
G. Santagati et al., "Opto-ultrasonic communications in wireless body area nanonetworks". Nano Communication Networks. vol. 5, Issues 1-2, Mar.-Jun. 2014, pp. 3-14.
G. Santagati et al., "A Comparison of MAC Protocols for Ultrasonic Intra-body Sensor Networks". BodyNets 2014 Proceedings of the 9th International Conference on Body Area Networks, pp. 104-110.
Z. Guan et al. "Ultrasonic Intra-body Networking: Interference Modeling, Stochastic Channel Access and Rate Control". 2015 IEEE Conference on Computer Communications (INFOCOM), pp. 1-9.
Chen et al., "OFDM modulated dynamic coded cooperation in underwater acoustic channels," IEEE Journal of Oceanic Engineering, vol. 40, No. 1, pp. 159-168, Jan. 2015.
Huang et al., "Comparison of sparse recovery algorithms for channel estimation in underwater acoustic OFDM with data-driven sparsity learning," Physical Communication 13 (2014) 156-167.
Kuo et al., "Cross-layer Routing on MIMO-OFDM Underwater Acoustic Links," in Proc. of IEEE Conf. on Sensor, Mesh and Ad Hoc Communications and Networks (SECON), Seoul, South Korea, Jun. 2012, pp. 1-9.
Aval et al., "Differentially Coherent Multichannel Detection of Acoustic OFDM Signals," IEEE Journal of Oceanic Engineering, vol. 40, No. 2, Apr. 2015, pp. 251-268.
Radosevic et al., "Adaptive OFDM modulation for Underwater Acoustic Communications: Design Considerations and Experimental Results," IEEE Journal of Oceanic Engineering, vol. 39, No. 2, Apr. 2014, pp. 357-370.
Tu et al., "Multiple Resampling Receiver Design for OFDM over Doppler-Distorted Underwater Acoustic Channels," IEEE Journal of Oceanic Engineering, vol. 38, No. 2, Apr. 2013, pp. 333-346.
Wan et al., "Adaptive modulation and coding for underwater acoustic OFDM," IEEE Journal of Oceanic Engineering, vol. 40, No. 2, pp. 327-336, Apr. 2015.
Santagati et al., "U-Wear: Software-Defined Ultrasonic Networking for Wearable Devices", Proceedings of the 13th Annual International Conference on Mobile Systems, Applications, and Services, pp. 241-256, 2015.

* cited by examiner

ULTRASONIC MULTIPLEXING NETWORK FOR IMPLANTABLE MEDICAL DEVICES

CROSS REFERENCE TO RELATED APPLICATIONS

This application claims priority under 35 U.S.C. § 120 of U.S. patent application Ser. No. 16/552,369, filed on Aug. 27, 2019, entitled "Ultrasonic Multiplexing Network for Implantable Medical Devices," which claims priority under 35 U.S.C. § 120 of U.S. patent application Ser. No. 15/622,492, filed on Jun. 14, 2017, entitled "Ultrasonic Multiplexing Network for Implantable Medical Devices," which claims priority under 35 U.S.C. § 119(e) of U.S. Provisional Application No. 62/349,711, filed on Jun. 14, 2016, entitled "Ultrasonic Multiplexing Network for Implantable Medical Devices," and which also claims priority under 35 U.S.C. § 120 of International Application No. PCT/US2016/012439, filed on Jan. 7, 2016, entitled "Ultrasonic Multiplexing Network for Implantable Medical Devices," which claims priority under 35 U.S.C. § 119(e) of U.S. Provisional Application No. 62/100,628, filed on Jan. 7, 2015, entitled "Multi-Carrier Ultrasonic Communications, Resource Allocation, and Medium Access for Implantable Devices," the disclosures of all of which are hereby incorporated by reference.

STATEMENT REGARDING FEDERALLY SPONSORED RESEARCH OR DEVELOPMENT

The invention was developed with financial support from Grant No. CNS-1253309 from the National Science Foundation. The U.S. Government has certain rights in the invention.

BACKGROUND

Implantable medical sensing and actuating devices with wireless capabilities are used in many digital health applications. Existing wireless medical implants are connected through radio frequency (RF) electromagnetic waves. RF-based solutions tend to scale down traditional wireless technologies, such as Wi-Fi or Bluetooth, to the intrabody environment, with little or no attention paid to the peculiar characteristics and safety requirements of the human body and to the privacy and security requirements of patients.

SUMMARY OF THE INVENTION

The invention relates to an implantable network of medical sensing and actuating devices that communicate via an ultrasonic communication system and method. The system and method employ an orthogonal frequency division multiplexing (OFDM) scheme to offer link-to-link physical layer adaptation, with distributed control to enable multiple access among interfering implanted devices. The data rate of the transmitters in the network can be adapted to a current level of interference by distributively optimizing the physical layer parameters.

Other aspects of the method and system include the following:

1. A system for transmitting data ultrasonically through biological tissue comprising:
    a network comprising a plurality of nodes, at least a portion of the nodes implantable within a body;
    a first node implantable in the body and comprising an ultrasonic transducer and a transmitter, and a second node comprising an ultrasonic receiver;
    the transmitter at the first node including an orthogonal frequency division multiplex (OFDM) signal generator operative to encode an input information bit stream on orthogonal subcarriers for transmission as an ultrasonic signal through the body to the ultrasonic receiver at the second node; and
    the ultrasonic receiver at the second node operative to decode the ultrasonic signal received from the first node to recover the information bit stream.
2. The system of embodiment 1, wherein the OFDM signal generator is operative to generate a baseband modulated signal as a sum over a number of subcarriers of the symbols to be transmitted as a function of a frequency spacing between the subcarriers for a time block of a given duration.
3. The system of embodiment 2, further comprising introducing a guard time between time blocks.
4. The system of embodiment 3, wherein the guard time comprises silence or a repetition of the time block.
5. The system of embodiment 2, further comprising a symbol mapper to map the bit stream into a constellation of a modulation scheme.
6. The system of embodiment 5, wherein the modulation scheme comprises M-phase-shift-keying or M-quadrature-amplitude-modulation.
7. The system of any of embodiments 1-6, wherein the OFDM signal generator comprises:
    a serial to parallel convertor to convert the input information bit stream into a plurality of parallel data strings,
    an inverse Fourier transformer to generate a frequency domain representation of the input information bit stream,
    a parallel to serial converter for converting the frequency domain representation into a serial stream, and
    an up-converter to convert the signal to a carrier frequency for transmission through the biological tissue.
8. The system of any of embodiments 1-7, wherein the receiver comprises:
    a down-converter to convert the received signal to a baseband signal,
    a serial to parallel converter to convert the baseband signal into a plurality of parallel data strings,
    a Fourier transformer; and
    a parallel to serial converter to convert the parallel data strings into a serial data string.
9. The system of any of embodiments 1-8, wherein the OFDM signal generator is operative to send symbols on a set of occupied subcarriers comprising a subset of available subcarriers.
10. The system of embodiment 9, wherein the occupied subcarriers are fixed or selected randomly and change in consecutive blocks within a frame.
11. The system of embodiment 10, wherein the occupied subcarriers are selected by a pseudo-random frequency-hopping sequence generated by seeding a random number generator with an identification unique to the transmitter.
12. The system of embodiment 9, wherein the occupied subcarriers have a fixed frequency.
13. The system of embodiment 9, wherein the occupied subcarriers are selected randomly and change in consecutive blocks within a frame.
14. The system of embodiment 13, wherein the occupied subcarriers are selected by a pseudo-random frequency-hopping sequence generated by seeding a random number generator with an identification unique to the transmitter.

15. The system of any of embodiments 1-14, wherein the OFDM signal generator is operative to send symbols in blocks at fixed or randomly selected time chips within a time frame.
16. The system of embodiment 15, wherein the OFDM signal generator is operative to send symbols according to a pseudo-random time hopping sequence generated by seeding a random number generator with an identification unique to the transmitter.
17. The system of any of embodiments 1-14, wherein the OFDM signal generator is operative to send symbols in clocks at fixed time chips within a time frame.
18. The system of any of embodiments 1-14, wherein the OFDM signal generator is operative to send symbols in blocks at randomly selected time chips within a time frame.
19. The system of embodiment 18, wherein the OFDM signal generator is operative to send symbols according to a pseudo-random time hopping sequence generated by seeding a random number generator with an identification unique to the transmitter.
20. The system of embodiment 19, wherein the receiver is operative to decode the ultrasonic signal at the receiver by seeding a random generator with the identification of the transmitter to generate the same pseudo-random time hopping sequence.
21. The system of any of embodiments 1-20, wherein the OFDM signal generator is operative to provide forward error correction.
22. The system of embodiment 21, wherein the forward error correction comprises adding t parity symbols to k information symbols to make an n symbol block.
23. The system of embodiment 22, wherein the forward error correction comprises the addition of parity symbols using a block code or a convolutional code.
24. The system of embodiment 23, wherein the block code comprises a Reed-Solomon code.
25. The system of any of embodiment 1-24, wherein the OFDM signal generator is operative to provide one or more modulation techniques at a subcarrier level, a block level, or a frame level.
26. The system of embodiment 25, wherein the modulation technique is selected to optimize a data rate as a function of one or more of a number of occupied subcarriers, a number of time chips per time frame, an error correction coding rate, and a modulation rate.
27. The system of any of embodiments 1-26, wherein the receiver is operative to detect an incoming frame from the transmitter and to identify a starting point of a packet.
28. The system of embodiment 27, wherein identifying the starting point comprises correlating the received ultrasonic signal with a local copy of a preamble preceding each OFDM frame.
29. The system of embodiment 28, wherein the preamble comprises a pseudo noise sequence or a chirp sequence.
30. The system of any of embodiments 1-29, wherein the receiver is operative to determine a signal to interference-plus-noise ratio as a function of instantaneous power, time-hopping frame length, and number of occupied subcarriers.
31. The system of any of embodiments 1-30, wherein the receiver is operative to maximize a transmission rate between the transmitter and the receiver by selecting an instantaneous power, a number of occupied subcarriers, a time-hopping frame length, a forward error correction coding rate and a modulation rate based on a level of interference and channel quality measured at the receiver and on a level of interference generated by the receiver in communications to other nodes.
32. The system of any of embodiments 1-31, wherein the receiver is operative to determine an instantaneous power value, a number of occupied subcarriers, a time-hopping frame length, a forward error correction coding rate and a modulation rate that maximizes a data rate.
33. The system of embodiment 32, wherein the receiver is further operative to maximize the data rate subject to a signal to interference-plus-noise ratio per node being above a minimum value and a data rate per node being above a minimum value.
34. The system of any of embodiments 1-33, wherein the receiver is further operative to determine an energy rate, the energy rate comprising an energy per bit or an average power radiated per second.
35. The system of embodiment 34, wherein the receiver is further operative to minimize the energy rate subject to a signal to interference-plus-noise ratio per node being above a minimum value and a data rate per node being above a minimum value.
36. The system of any of embodiments 1-35, wherein the transmitter is operative to open communication to a receiver on a common control channel using a two-way hand-shake procedure, and, after receiving a clear-to-transmit signal from the receiver, to transmit on a dedicated channel to the receiver a frequency-hopping sequence and a time-hopping sequence, and the receiver is operative to transmit to the transmitter an optimal transmission strategy.
37. The system of embodiment 36, wherein the transmitter is operative to determine the frequency-hopping sequence and the time-hopping sequence by seeding a random number generator with an identification unique to the transmitter.
38. The system of any of embodiments 36-37, wherein the optimal transmission strategy comprises a number of occupied subcarriers, a time-hopping frame length, a forward error correction coding rate, and a modulation rate.
39. The system of any of embodiments 36-38, wherein the receiver is operative to exchange information regarding a level of tolerable interference over the common control channel with other receiving nodes.
40. The system of any of embodiments 1-39, wherein the first node further comprises an ultrasonic receiver to decode an ultrasonic signal received from another node of the plurality of nodes.
41. The system of any of embodiments 1-40, wherein the second node further comprises an ultrasonic transducer and a transmitter, the transmitter at the second node including an orthogonal frequency division multiplex (OFDM) signal generator operative to encode an input information bit stream on orthogonal subcarriers for transmission as an ultrasonic signal through the body to the first node or to another node of the plurality of nodes or to all of the nodes of the plurality of nodes.
42. The system of any of embodiments 1-41, wherein all of the nodes of the plurality of nodes comprise a transmitter including an orthogonal frequency division multiplex (OFDM) signal generator operative to encode an input information bit stream on orthogonal subcarriers for transmission as an ultrasonic signal through the body and an ultrasonic receiver to decode an incoming ultrasonic signal to recover an information bit stream.

43. The system of any of embodiments 1-42, wherein the first node and the second node are operable at a data rate of at least 28 Mbit/s.
44. The system of any of embodiments 1-43, wherein the second node is implantable within the body.
45. The system of any of embodiments 1-44, wherein the second node is an endoscopic pill.
46. The system of any of embodiments 1-43, wherein the second node is disposed outside of the body.
47. The system of any of embodiments 1-46, wherein the biological tissue is human tissue or non-human animal tissue.
48. The system of any of embodiments 1-47, wherein the first implantable node further comprises a sensor operative to sense one or more biological parameters.
49. The system of embodiment 48, wherein the sensor is selected from the group consisting of a cardiac rhythm monitor, a pulse monitor, a blood pressure sensor, a glucose sensor, a drug pump monitor, a neurological sensor, a motion sensor, a gyroscope, an accelerometer, a sleep sensor, a REM sleep duration sensor, a still camera, a video camera, a sensor for one or more biomolecules, a sensor for one or more pharmaceutical agents or pharmaceutical formulation ingredients, and a sensor for a dissolved gas or ion, or for pH, ionic strength, or osmolarity.
50. The system of embodiment 49, wherein the sensor for one or more biomolecules comprises a sensor for one or more peptides, oligopeptides, polypeptides, proteins, glycoproteins, antibodies, antigens, nucleic acids, nucleotides, oligonucleotides, polynucleotides, sugars, disaccharides, trisaccharides, oligosaccharides, polysaccharides, lipids, glycolipids, proteolipids, cytokines, hormones, neurotransmitters, metabolites, glycosaminoglycans, and proteoglycans.
51. The system of any of embodiments 1-50, wherein the first implantable node further comprises an actuator.
52. The system of embodiment 51, wherein the actuator is selected from the group consisting of a drug pump, a heart stimulator, a heart pacemaker, a bone growth stimulator, and a neuromuscular electrical stimulator.
53. The system of any of embodiments 1-52, wherein at least two of the plurality of nodes are implantable within a body.
54. The system of any of embodiments 1-53, wherein at least three of the plurality of nodes are implantable within a body.
55. The system of embodiments 1-54, wherein at least a portion of the nodes are implanted in the body.
56. The system of embodiments 1-55, wherein all of the nodes of the plurality of nodes are implantable within the body.
57. A method for transmitting data ultrasonically through biological tissue comprising:
at a first node implanted in a body, encoding an information bit stream on orthogonal subcarriers using an orthogonal frequency division multiplexing modulation scheme;
transmitting the encoded signal through biological tissue; and
at a second node, receiving the encoded signal and decoding the signal to recover the information bit stream.
58. The method of embodiment 57, encoding the information bit stream comprises generating a baseband modulated signal as a sum over a number of subcarriers of the symbols to be transmitted as a function of a frequency spacing between the subcarriers for a time block of a given duration.
59. The method of embodiment 58, further comprising introducing a guard time between time blocks.
60. The method of embodiments 59, wherein the guard time comprises silence or a repetition of the time block.
61. The method of embodiment 58, further comprising mapping the bit stream into a constellation of a modulation scheme.
62. The method of embodiment 61, wherein the modulation scheme comprises M-phase-shift-keying or M-quadrature-amplitude-modulation.
63. The method of any of embodiments 57-62, further comprising, at the first node:
serial-to-parallel converting the input information bit stream into a plurality of parallel data strings,
generating a frequency domain representation of the input information bit stream by an inverse Fourier transform,
parallel-to-serial converting the frequency domain representation into a serial stream, and
up-converting the signal to a carrier frequency for transmission through the biological tissue.
64. The method of any of embodiments 57-63, further comprising, at the second node:
down-converting the received signal to a baseband signal,
serial-to-parallel converting the baseband signal into a plurality of parallel data strings,
Fourier transforming the plurality of data strings; and
parallel-to-serial converting the parallel data strings into a serial data string.
65. The method of any of embodiments 57-64, further comprising sending symbols on a set of occupied subcarriers comprising a subset of available subcarriers.
66. The method of embodiment 65, wherein the occupied subcarriers are fixed or selected randomly and change in consecutive blocks within a frame.
67. The method of embodiment 66, wherein the occupied subcarriers are selected by a pseudo-random frequency-hopping sequence generated by seeding a random number generator with an identification unique to the first node.
68. The method of embodiment 65, wherein the occupied subcarriers are fixed.
69. The method of embodiment 65, wherein the occupied subcarriers are selected randomly and change in consecutive blocks within a frame.
70. The method of embodiment 69, wherein the occupied subcarriers are selected by a pseudo-random frequency-hopping sequence generated by seeding a random number generator with an identification unique to the first node.
71. The method of any of embodiments 57-70, further comprising sending symbols in blocks at fixed or randomly selected time chips within a time frame.
72. The method of embodiment 71, further comprising sending symbols according to a pseudo-random time hopping sequence generated by seeding a random number generator with an identification unique to the transmitter.
73. The method of any of embodiments 57-70, further comprising sending symbols in blocks at fixed time chips within a time frame.
74. The method of any of embodiments 57-70, further comprising sending symbols in blocks at randomly selected time chips within a time frame.
75. The method of embodiment 74, further comprising sending symbols according to a pseudo-random time hopping sequence generated by seeding a random number generator with an identification unique to the transmitter.
76. The method of any of embodiments 71 and 74, further comprising, at the second node, decoding the ultrasonic signal by seeding a random generator with the identification of the first node to generate the same pseudo-random time hopping sequence.
77. The method of any of embodiments 57-76, further comprising providing forward error correction.
78. The method of embodiment 77, wherein the forward error correction comprises adding t parity symbols to k information symbols to make an n symbol block.
79. The method of embodiment 78, wherein the forward error correction comprises the addition of parity symbols using a block code or a convolutional code.
80. The method of embodiment 79, wherein the block code comprises a Reed-Solomon code.
81. The method of any of embodiments 57-80, further comprising providing one or more modulation techniques at a subcarrier level, a block level, or a frame level.
82. The method of embodiment 81, wherein the modulation technique is selected to optimize a data rate as a function of one or more of a number of occupied subcarriers, a number of time chips per time frame, an error correction coding rate, and a modulation rate.
83. The method of any of embodiments 57-82, further comprising, at the second node, detecting an incoming frame from the first node and identifying a starting point of a packet.
84. The method of embodiment 83, wherein identifying the starting point comprises correlating the received ultrasonic signal with a local copy of a preamble preceding an OFDM frame.
85. The method of embodiment 84, wherein the preamble comprises a pseudo noise sequence or a chirp sequence.
86. The method of any of embodiments 57-85, further comprising, at the second node, determining a signal to interference-plus-noise ratio as a function of instantaneous power, time-hopping frame length, and number of occupied subcarriers.
87. The method of any of embodiments 57-86, further comprising, at the second node, maximizing a transmission rate between the transmitter and the receiver by selecting an instantaneous power, a number of occupied subcarriers, a time-hopping frame length, a forward error correction coding rate and a modulation rate based on a level of interference and channel quality measured at the receiver and on a level of interference generated by the second node in communications to other nodes.
88. The method of any of embodiments 57-87, further comprising, at the second node, determining an instantaneous power value, a number of occupied subcarriers, a time-hopping frame length, a forward error correction coding rate and a modulation rate that maximizes a data rate.
89. The method of embodiment 88, further comprising, at the second node, maximizing the data rate subject to a signal to interference-plus-noise ratio per node being above a minimum value and a data rate per node being above a minimum value.
90. The method of any of embodiments 57-89, further comprising, at the second node, determining an energy rate, the energy rate comprising an energy per bit or an average power radiated per second.
91. The method of embodiment 90, further comprising, at the second node, minimizing the energy rate subject to a signal to interference-plus-noise ratio per node being above a minimum value and a data rate per node being above a minimum value.
92. The method of any of embodiments 57-91, further comprising, at the first node, opening communication to the second node on a common control channel using a two-way hand-shake procedure, and, after receiving a clear-to-transmit signal from the second node, transmitting on a dedicated channel to the second node a frequency-hopping sequence and a time-hopping sequence, and at the second node, transmitting to the first node an optimal transmission strategy.
93. The method of embodiment 92, further comprising, at the first node, determining the frequency-hopping sequence and the time-hopping sequence by seeding a random number generator with an identification unique to the transmitter.
94. The method of any of embodiments 92-93, wherein the optimal transmission strategy comprises a number of occupied subcarriers, a time-hopping frame length, a forward error correction coding rate, and a modulation rate.
95. The method of any of embodiments 57-94, further comprising, at the second node, exchanging information regarding a level of tolerable interference over the common control channel with other receiving nodes.
96. The method of any of embodiments 57-95, wherein the first node and the second node are operable at a data rate of at least 28 Mbit/s.
97. The method of any of embodiments 57-96, wherein the second node is implanted within the body.
98. The method of any of embodiments 57-97, wherein the second node is an endoscopic pill.
99. The method of any of embodiments 57-98, wherein the second node is disposed outside of the body.
100. The method of any of embodiments 57-99, wherein the biological tissue is human tissue or non-human animal tissue.
101. The method of any of embodiments 57-100, further comprising receiving at the first node an encoded ultrasonic signal and decoding the signal to recover an information bit stream.
102. The method of any of embodiments 57-101, further comprising sensing at one or more of the implantable nodes one or more biological parameters sensed by a sensor.
103. The method of embodiment 102, wherein the sensor is selected from the group consisting of a cardiac rhythm monitor, a pulse monitor, a blood pressure sensor, a glucose sensor, a drug pump monitor, a neurological sensor, a motion sensor, a gyroscope, an accelerometer, a sleep sensor, a REM sleep duration sensor, a still camera, and a video camera.
104. The method of any of embodiments 57-103, further comprising actuating at one or more of the implantable nodes an actuator.
105. The method of embodiment 104, wherein the actuator is selected from the group consisting of a drug pump, a heart stimulator, a heart pacemaker, a bone growth stimulator, and a neuromuscular electrical stimulator.

DESCRIPTION OF THE DRAWINGS

The invention will be more fully understood from the following detailed description taken in conjunction with the accompanying drawings in which.

DETAILED DESCRIPTION OF THE INVENTION

Figure 1:
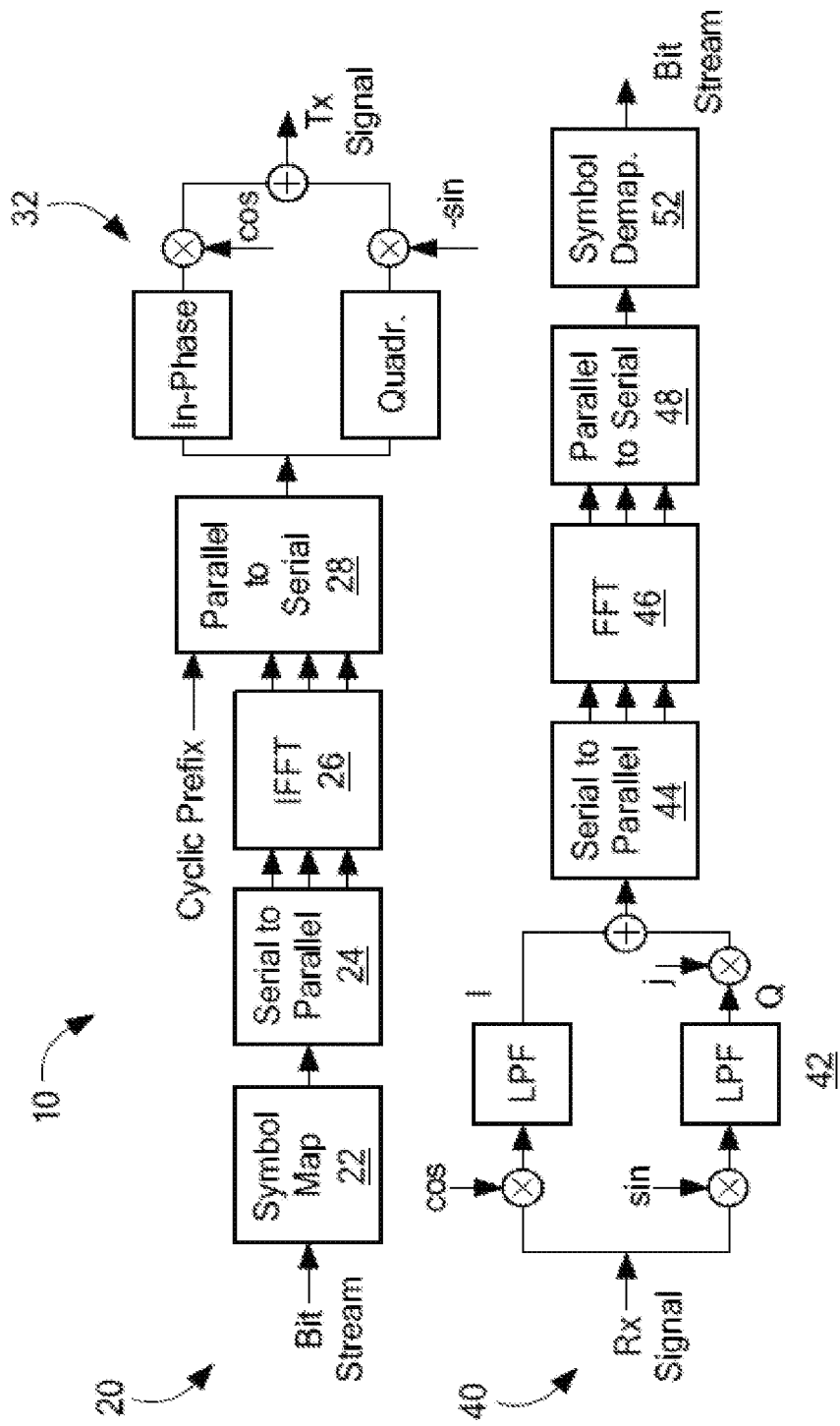
FIG. 1 is a schematic diagram of an OFDM encoder (top) and decoder (bottom)

Radio frequency (RF) technology presents several limitations that can negatively affect patients' medical experience and safety. First, RF waves do not propagate well in biological tissues, which leads to higher energy consumption and heating of the tissues. Second, the RF frequency spectrum is scarce, strictly regulated, and already crowded with many devices interfering with one another. Therefore, RF-based technologies raise serious concerns about potential interference from existing RF communication systems that can unintentionally undermine the reliability and security of an intra-body network, and ultimately the safety of the patient. Third, RF communications can be easily jammed, i.e., intentionally disrupted by artificially generated interference, or eavesdropped by malicious agents. This raises major privacy and security red flags for intra-body networks, and a risk for the patient. Fourth, the medical community is still divided on the risks caused by continuous exposure of human tissues to RF radiation. Therefore, a massive deployment of RF implantable devices may represent a potential risk for the patient. Finally, the dielectric nature of the human body also affects the coupling between on-body RF antennas and the body itself. In particular, the gain and the radiation pattern of the antenna deteriorate because of the contact or proximity with the human body, while the resonant frequency and the input impedance of the antenna may shift from their nominal values.

Accordingly, a communications system is described herein that uses ultrasonic waves as an alternative carrier of information in biological tissues. Ultrasonic waves are acoustic waves with frequency higher than the upper threshold for human hearing, i.e., generally 20 kHz. In some embodiments, the communications system can use near-ultrasonic waves, such as greater than 17 kHz. The ultrasonic communications system employs an orthogonal frequency division multiplexing (U-OFDM)-based networking scheme that offers link-to-link physical layer adaptation, with distributed control to enable multiple access among interfering implanted devices. U-OFDM is based on the idea of regulating the data rate of each transmitter to adapt to the current level of interference by distributively optimizing the physical layer parameter.

1. Ultrasonic Intra-Body Communications

Ultrasounds are mechanical waves that propagate in an elastic medium at frequencies above the upper limit for human hearing, i.e., 20 kHz.

Attenuation. Two main mechanisms contribute to ultrasound attenuation in tissues, i.e., absorption and scattering. An initial pressure $P_0$ decays at a distance d $$P(d) = P_0 e^{-\alpha d}, \tag{1}$$

where $\alpha$ (in [Np·cm$^{-1}$]) is an amplitude attenuation coefficient that captures all the effects that cause dissipation of energy from the ultrasound wave. Parameter $\alpha$ depends on the carrier frequency through $\alpha = af^b$, where f represents the carrier frequency (in MHz) and a (in [Np m$^{-1}$ MHz$^{-b}$]) and b are attenuation parameters characterizing the tissue.

Propagation Speed. Ultrasonic wave propagation is affected by propagation delays that are orders of magnitude higher than RF. The propagation speed of acoustic waves in biological tissues is approximately 1500 m/s, as compared to $2 \times 10^8$ m/s for RF waves.

Operating Frequency. Considerations in determining the operating frequency are (i) the frequency dependence of the attenuation coefficient, and (ii) the frequency dependence of the beam spread of ultrasonic transducers (which is inversely proportional to the ratio of the diameter of the radiating surface and the wavelength). Therefore, higher frequencies help keep the transducer size small, but result in higher signal attenuation. Since most biomedical sensing applications require directional transducers, one needs to operate at the lowest possible frequencies compatible with small-size transducers and required signal bandwidth. For propagation distances in the order of several cm. the operating frequency should not exceed 10 MHz.

Reflections and Scattering. The human body is composed of different organs and tissues with different sizes, densities and sound speeds. Therefore, it can be modeled as an environment with pervasive presence of reflectors and scatterers. The direction and magnitude of the reflected wave depend on the orientation of the boundary surface and on the acoustic impedance of the tissues, while scattered reflections occur when an acoustic wave encounters an object that is relatively small with respect to its wavelength or a tissue with an irregular surface. Consequently, the received signal is obtained as the sum of numerous attenuated, possibly distorted, and delayed versions of the transmitted signal.

2. Ultrasonic Orthogonal Frequency Division Multiplexing (U-OFDM)

OFDM. Orthogonal frequency division multiplexing (OFDM) uses a large number of closely spaced orthogonal subcarriers, such that for each subcarrier the channel is subject to flat fading. In the time domain, this comprises dividing a high data rate stream into multiple low rate streams, each transmitted on a different subcarrier. In this way the symbol rate on each subcarrier is reduced, and hence the effect of intersymbol interference (ISI) caused by multipath delay spread is reduced. In each sub-carrier a conventional modulation scheme can be used, e.g., M-Phase-Shift-Keying (PSK) and M-Quadrature-Amplitude-Modulation (QAM). OFDM offers high spectral efficiency and robustness against narrow-band co-channel interference, intersymbol interference (ISI) and multipath fading. Assume a bandwidth B divided in a set $\mathcal{F}$ of subcarriers, $|\mathcal{F}|$ being the number of subcarriers. Assume $|\mathcal{F}|$ symbols to be transmitted $X_k$, with k=1, . . . , $|\mathcal{F}|$. The $|\mathcal{F}|$ symbols can be drawn from any of the constellation available, e.g., $X_k = \{-1, 1\}$ for a BPSK modulation. The OFDM baseband modulated signal is given by $$x(t) = \sum_{k=0}^{|\mathcal{F}|-1} X_k e^{2\pi k f_s t}, t \in [0, T_B] \tag{2}$$

where $f_s$ is the frequency spacing between subcarriers. The expression above represents an OFDM block of duration $T_B$, where each symbol $X_k$ is transmitted on the $k^{th}$ subcarrier. If $\mathcal{F}$ is selected equal to 1, than the U-OFDM node will transmit in a single-carrier fashion, e.g., traditional narrowband modulations. An OFDM frame is defined as a set of consecutive OFDM blocks. To reduce the effect of multipath delay spread, a guard time TG is introduced between each OFDM block, such that multipath components from one block cannot interfere with the next block. The guard time could contain just silence, i.e., zero-padding (ZP), or a cyclic repetition of the block, i.e., cyclic prefixing (CP). ZP determines lower transmission power and simpler transmitter structure when compared to CP, but potentially affects the orthogonality of the subcarriers creating inter-carrier-interference (ICI). In the following, ZP is assumed unless otherwise specified. The expression in (2) becomes:

$$x(t) = \sum_{k=0}^{|\mathcal{F}|-1} X_k e^{2\pi k f_s t} g(t), t \in [0, T_c] \qquad (3)$$

where $T_c = T_B + T_G$ is the chip time, and g(t) represents the ZP operation $$g(t) = \begin{cases} 1 & t \in [0, T_B] \\ 0 & \text{otherwise} \end{cases} \qquad (4)$$

The resulting data rate [bit/s] is expressed as:

$$R = \frac{|\mathcal{F}|\log_2(M)}{T_c}, \qquad (5)$$

where M is the modulation rate, e.g., 1 for binary phase shift keying (BPSK), that is obtained as $2^N$, N being the number of bits conveyed per symbol.

The passband transmitted signal is obtained up-converting the baseband signal to a carrier frequency $f_c$.

$$s(t) = \text{Re}\left\{\left[\sum_{k=0}^{|\mathcal{F}|-1} X_k e^{2\pi k f_s t} g(t)\right] e^{-2\pi f_c t}\right\}, t \in [0, T_c] \qquad (6)$$

Note that by assuming a sampling interval Ts, i.e., $t=nT_s$, and selecting the minimum frequency spacing between subcarriers that keeps orthogonality, i.e., $f_s=1/nT_s$, the expression in (6), except for a constant, represents an N-point inverse discrete Fourier transform (IDFT) of the $X_k$ sequence. When N is a power of two, the IDFT operation can be efficiently implemented using inverse fast-Fourier-transform (IFFT) algorithms.

FIG. 1 shows a block diagram of an OFDM signal generator 10 with an encoder 20 and decoder 40. In the encoder 20, the bit stream is mapped into a conventional modulation constellation, e.g., M-PSK and M-QAM, at symbol mapper module 22. The serial symbol stream is converted into a parallel stream at serial-to-parallel converter 24 and fed into an IFFT module 26 that outputs the symbol representation in the frequency domain. The frequency domain samples are then converted into a serial stream, and a cyclic prefix (or the zero padding) is interleaved at the beginning of each IFFT block at parallel-to-serial converter 28. The resulting signal is up-converted to the carrier frequency $f_c$ at up-converter module 32 and transmitted. At the receiver side, the decoder 40 down- converts the received signal to baseband at down-converter module 42, and low-pass-filters it. The baseband filtered signal is transformed into a parallel stream at serial-to-parallel converter 44, fed into a fast-Fourier-transform (FFT) module 46, and re-serialized at parallel-to-serial converter 48 after discarding the cyclic prefix. The resulting symbol stream is then demapped at symbol demapper module 52 to obtain the received bit stream.

Adaptive Subcarrier Frequency-Hopping. In some embodiments, U-OFDM can use an adaptive subcarrier frequency-hopping that allows each transmitter to send symbols only in a subset of the available subcarriers, i.e., set of occupied subcarriers $\mathcal{F}_O$, leaving the rest empty, i.e., set of null subcarriers $\mathcal{F}_N$. The set of occupied subcarriers is selected randomly, and it changes in each consecutive block, according to a pseudo-random frequency-hopping sequence (FHS), i.e., a sequence generated by seeding a random number generator with the transmitter unique ID. The number of occupied subcarriers for the $i^{th}$ transmitter $N_{f,i}=\mathcal{F}_{o,i}$ can be adaptively regulated between 1 and $N_{f,max}=|\mathcal{F}|$, and is constant within an OFDM frame. Moreover, the sets of occupied and null subcarriers satisfy $=\mathcal{F}_N \cup \mathcal{F}_o$. The baseband OFDM block for the $i^{th}$ transmitter can be rewritten as $$x(t) = \sum_{k \in \mathcal{F}_{o,i}} X_k e^{2\pi k f_s t} g(t), t \in [0, T_c] \qquad (7)$$

Since each subcarrier carries one symbol per block the resulting data rate becomes:

$$R(|\mathcal{F}_o|) = \frac{N_f \log_2(M)}{T_c}. \qquad (8)$$

By regulating the number of occupied subcarriers, $N_f$, a transmitter can adapt its data rate based on the level of occupancy of the frequency spectrum. The transmitter can also adapt $N_f$ based on the estimated coherence bandwidth of the channel. By pseudo-randomly selecting the set of subcarriers in each OFDM block, the probability that communications from different transmitters completely overlap can be lowered. Overlapping subcarriers produce subcarrier collisions, thus potential symbol detection errors. Ideally, increasing the number of available subcarriers $N_{f,max}$ may allow more transmitters to communicate in the same channel with lower probability of subcarrier collisions. However, $N_{f,max}$ is limited by the total available bandwidth B, which is limited because of the ultrasonic transducer characteristics, and by the computational power of the transmitters, i.e., the larger is $N_{f,max}$, the higher is the computational complexity to process the digital OFDM signals. Finally, subcarrier frequency-hopping also mitigates the effect of frequency-selective and fast fading in the intra-body channel caused by the presence of scatters and reflectors, as discussed above. Since the channel attenuates individually each subcarrier, the transmission performance highly fluctuates across different subcarriers and consequent OFDM blocks. By pseudo-randomly selecting the set of occupied subcarrier in each OFDM block a transmitter can average the fading effect.

It will be appreciated that in some embodiments, the U-OFDM signal generator can use subcarriers at fixed frequencies rather than at randomly selected subcarriers.

Adaptive Time-Hopping. Since subcarriers $N_f$ cannot be increased indefinitely, i.e., the probability of subcarrier collision cannot be lowered indefinitely, the adaptive subcarrier frequency-hopping may not be sufficient in heavy-load scenarios. For this reason, in some embodiments, U-OFDM can also leverage an adaptive time-hopping scheme that spreads in time OFDM blocks to further lower the probability of subcarrier collisions. We consider a slotted time divided in chips of duration $T_c$, with chips organized in frames of duration $T_f = N_h \cdot T_c$, where $N_h$ is the number of chips per frame. Each transmitter can send one OFDM block in one chip per frame, and determines in which chip to transmit based on a pseudo-random time hopping sequence (THS), i.e., a sequence generated by seeding a random number generator with the transmitter's unique ID. The baseband OFDM block for the $i^{th}$ transmitter and the $j^{th}$ OFDM block can be rewritten as $$x_i(t, j) = \sum_{k \in \mathcal{F}_o^{(i)}} X_k e^{2\pi k f_s t} g(t) h(t), t \in [0, T_f] \quad (9)$$

The function h(t) represents the time-hopping spreading operation:

$$h(t) = \begin{cases} 1 & \text{if } c_{j,i} \\ 0 & \text{otherwise} \end{cases} \quad (10)$$

where $\{c_{j,i}\}$ is the time hopping sequence of the $i^{th}$ source, with $0 \leq c_{j,i} \leq N_h - 1$. The resulting data rate becomes:

$$R(N_f, N_h) = \frac{N_f \log_2(M)}{T_f} = \frac{N_f \log_2(M)}{T_c N_h}. \quad (11)$$

By regulating the time-hopping frame length $N_h$, i.e., the average inter-block time, a transmitter can adapt its data rate, and as a consequence modify the average radiated power and therefore the level of interference generated to other ongoing communications. It can be observed that an individual user (transmitter) has little incentive to increase its frame size, since that results in a lower achievable data rate, without any major benefit for the user itself (since the level of interference perceived depends primarily on the frame length of the other users, and not on its own). However, a longer time frame reduces the interference generated to the other users. Therefore, selfish/greedy frame adaptation strategies do not work well in this context and cooperative strategies are preferred.

Figure 2:
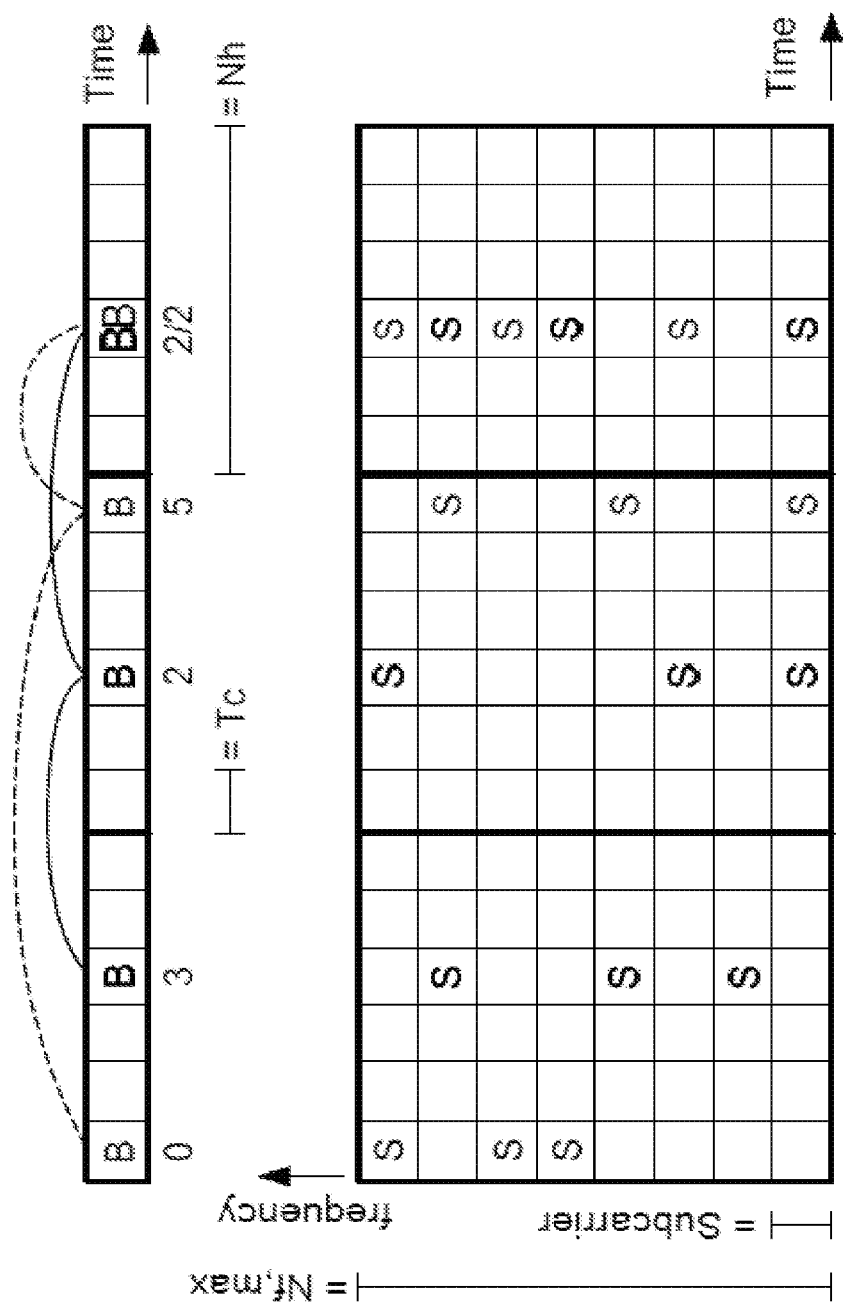
FIG. 2 is a schematic diagram of an example of pure time-hopping strategy (top), and a combined frequency- and time-hopping strategy (bottom)

FIG. 2 shows an example of time-hopping strategy (top), and a combined frequency- and time-hopping strategy (bottom). In the pure time-hopping strategy, consider two users with $N_{h,1} = N_{h,2} = 5$, transmitting one block B per time-hopping frame, and using time hopping sequences $TH_1 = \{3, 2, 2\}$ and $TH_2 = \{0, 5, 2\}$. Since the two users select the same time chip in the third time-hopping frame, a collision between the two blocks occurs. This example can be extended by considering a combined frequency- and time-hopping strategy. Assume $N_{f,1} = N_{f,2} = 3$ and $N_{f,max} = 8$. The two users transmit one symbol S per subcarrier per time-hopping frame. It can be observed that, although both users select the same subcarrier in their set of occupied subcarriers in the second time-hopping frame, the time-diversity introduced by the time-hopping avoids the collision between the two symbols. Similarly, in the third time-hopping frame the collision in time is avoided by leveraging of the frequency-diversity introduced by the frequency-hopping strategy.

It will be appreciated that is some embodiments, the U-OFDM signal generator can use fixed time chips with a time frame. In some embodiments, the time frame can comprise a variable number of time chips, with a minimum of one time chip (i.e., no time spreading). In some embodiments, an adaptive time-hopping scheme can be used alone, i.e., without an adaptive subcarrier frequency hopping scheme, or with a fixed frequency subcarrier scheme.

Adaptive Channel Coding. Since time and frequency hopping sequences are pseudo-randomly generated, collisions can still occur. In some embodiments, to mitigate the effect of mutual interference from co-located devices, U-OFDM can implement an adaptive channel coding that dynamically regulates the coding rate to adapt to channel conditions and interference level. In U-OFDM, coding adaptation is performed at the subcarrier level, i.e., in each subcarrier the coding rate is individually and independently adapted to combat the effect of the channel distortions that occurs in that specific subcarrier. One embodiment uses forward error correction (FEC) functionality based on Reed-Solomon (RS) codes. RS codes are non-binary cyclic linear block error-correcting codes used in data storage and data transmission systems that have strong capability to correct both random and burst errors. An RS code can be denoted as RS(s,n,k), where s is the symbol size in bits, n is the block length and k is the message length, with k<n. An RS encoder takes k information symbols and adds t parity symbols to make an n symbol block. Therefore, there are t=n-k overhead symbols. On the other hand, an RS decoder is able to decode the received n-symbol block, and can correct up to t/2 data symbols that may contain potential errors due to the channel fluctuation or collisions with interfering packets. The RS coding rate $r_c$, can be defined as the ratio between the message length and the block length, i.e., $r_c = k/n$. Since the coding operation introduces overhead symbols, the information rate is further reduced by a factor $1/r_c$, i.e., $$R(N_f, N_h, r_c) = \frac{r_c N_f \log_2(M)}{T_c N_h}. \quad (12)$$

while the energy required for transmitting one bit is increased by a factor $1/r_c$. Note that there is a tradeoff between robustness to multi-user interference (which increases with lower coding rate), and energy consumption and information rate.

Alternative FEC technologies can also be used, for example convolutional codes that work on bit or symbol streams of arbitrary length and can be efficiently decoded with the Viterbi algorithm.

Adaptive Modulation. In some embodiments, adaptive modulation techniques can be used, which comprise adapting the modulation scheme in use to the channel condition to mitigate the effect of frequency-selective and fast fading and regulate the transmission rate. In U-OFDMA, adaptive modulation techniques can operate at the subcarrier level, at the block level or at the frame level. At the subcarrier level, different modulation schemes are selected for individual OFDM subcarriers in each OFDM block, to employ higher order modulations on subcarriers with high signal-to-noise ratio (SNR), lower order modulations on subcarriers with lower SNR, and no transmission on subcarriers with very low SNR. At the block and frame level, a single modulation scheme is used in all the subcarriers, and it can be changed every OFDM block or frame, respectively, based on the average SNR in all the subcarriers.

Frame and block level adaptation offer lower complexity when compared to subcarrier level adaptive modulation techniques, and in some embodiments, they can be a preferred choice when hardware resources are a constraint in miniaturized implantable devices. However, subcarrier level adaptive modulation techniques offer higher granularity that can be needed to achieve a desired communication quality of service in highly frequency selective channels. Section 3 below discusses joint dynamic adaptation of instantaneous power, number of occupied subcarriers, time-hopping frame length, FEC coding rate and modulation. Finally, since the modulation can vary between OFDM frames, the information rate is now also a function of the modulation rate M, i.e., $R(N_f, N_h, r_c, M)$.

Frame Synchronization. At the receiver, OFDM frame synchronization and "time hopping" synchronization must be performed to properly decode the received signal. Frame synchronization comprises finding the correct time instant corresponding to the start of an incoming packet at the receiver, and is achieved in two steps. First, an energy collection approach identifies any incoming frame, i.e., coarse synchronization. Once a frame is detected, the receiver performs a fine synchronization operation that identifies the exact starting point of the packet. Fine synchronization is achieved by correlating the received signal with a local copy of the preamble, i.e., an a priori known sequence that precedes each OFDM frame. After correlating the received signal and the expected signal, the receiver identifies the starting point of the packet as the time instant where the correlation is maximized. The second step comprises finding the time-hopping sequence to hop chip-by-chip to find the transmitted OFDM blocks. This can be achieved by seeding the random generator with the same seed used by the transmitter, and therefore generating the same pseudo-random time-hopping sequence.

U-OFDM can use as a preamble two different sequences, i.e., a pseudo noise (PN)-sequence and a chirp sequence. The former is a binary sequence with sharp autocorrelation peak and low cross-correlation peaks, that can be deterministically generated. Because of their desirable correlation characteristics, PN-sequences have strong resilience to multipath, and are well suited for ultrasonic intra-body channel, where reflections and scattering strongly affect the signal propagation, as discussed above in Section 1. The chirp sequence is a sinusoidal waveform whose frequency varies from an initial frequency $f_0$ to a final frequency $f_1$ within a certain time T. Chirps have been used in radars due to their good autocorrelation and robustness against Doppler effect. In fact, a frequency-shifted chirp still correlates well with the original chirp, although with lower amplitude and time-shifted peak. This characteristic makes chirp synchronization desirable in ultrasonic intra-body channels under severe Doppler effect conditions as experienced, for example, by an ingestible pill-sized camera moving in the digestive tract of the patient. The price paid for the Doppler robustness is higher cross-correlation peaks compared to PN-sequences that result in lower resilience to multipath.

Channel Estimation and Equalization. As discussed in Section 1, ultrasonic intra-body communications are affected by multipath and Doppler spread, leading to frequency selectivity. Since by using OFDM the symbol duration in each subcarrier is long compared to channel spread, inter-symbol interference (ISI) can be neglected in each subcarrier. However, the OFDM receiver is strongly limited by the inter-channel interference (ICI) due to fast channel variations within each OFDM symbol, especially if a ZP scheme is used. In some embodiments, channel estimation and equalization functionalities can be used to allow estimating the channel impulse response (CIR) and mitigating the distortion produced by the channel.

U-OFDM can implement both training-based and pilot-tone-based channel estimation. The training-based approach requires the presence of a training sequence known a priori in the transmitted packet, e.g., the synchronization preamble sequence, discussed in Section 2, to estimate the CIR. By correlating the output of the channel, i.e., the received signal, with the input, i.e., the known preamble sequence, an estimate of the time-domain CIR can be obtained. The pilot-tone-based approach estimates the channel for each OFDM block by leveraging a sequence of pilot symbols known a priori carried by a predefined group of subcarriers, i.e., pilot-subcarriers. This approach is suited for transmissions in channels that exhibit high time-variation, and therefore require estimating the CIR in each OFDM block. U-OFDM uses the CIR estimate for equalization, e.g., zero-forcing (ZF) or maximum-ratio combining (MRC), that aims to minimize the ICI signal distortion produced by the channel. Finally, to further reduce the ICI distortion, frequency-offset estimation due to Doppler effect is performed by leveraging the null subcarriers.

Signal to Interference-Plus-Noise Ratio. The signal to interference-plus-noise ratio (SINR) at the receiver of link i averaged on all the occupied subcarriers and on a time-hopping frame length is defined as $$SINR_i(P, N_f, N_h) = \sum_j^{N_{f,i}} \frac{P_i^{(j)} g_{i,i}^{(j)} N_{h,i} T_c}{\eta^{(j)} + T_c \sum_{k \in I_i} \frac{N_{f,k}}{N_{f,i}} P_k^{(j)} g_{k,i}^{(j)}}, \quad (13)$$

where $P_i^{(j)}$ is the instantaneous power emitted by the $i^{th}$ transmitter on the $j^{th}$ subcarrier, $g_{i,k}^{(j)}$ is the path gain between the $j^{th}$ transmitter and the $k^{th}$ receiver on the $j^{th}$ subcarrier, and $\eta^{(j)}$ represents background noise energy on the $j^{th}$ subcarrier. The set $I_i$ represents the set of links whose transmitter interferes with the receiver of link i. Note that, the expression in (13) depends on the array of instantaneous power, time-hopping frame length and number of occupied subcarrier of all the ongoing communications in the network, i.e., $P, N_h, N_f$, whose $i^{th}$ elements are $P_i N_{h,i}$ and $N_{f,i}$, respectively. The term $N_{f,k}/N_{f,i}$ is the relative number of occupied carriers between the $k^{th}$ interferer and the $i^{th}$ user. This ratio scales/weights the interference effect of the $k^{th}$ transmitter over the communication of the $i^{th}$ user. When different links use different frame lengths, (13) becomes $$SINR_i(P, N_f, N_h) = \sum_j^{N_{f,i}} \frac{P_i^{(j)} g_{i,i}^{(j)} N_{h,i} T_c}{\eta^{(j)} + T_c \sum_{k \in I_i} \frac{N_{f,k}}{N_{f,i}} \frac{N_{b,i}}{N_{h,k}} P_k^{(j)} g_{k,i}^{(j)}}, \quad (14)$$

The term $N_{h,i}/N_{h,k}$ accounts for the level of interference generated by each interferer k to the receiver of link i, i.e., the number of pulses transmitted by the $k^{th}$ transmitter during the time frame of the $i^{th}$ user.

Note that when the node of interest increases (decreases) its frame length, $N_{h,i}$, while the other nodes do not, no variation is expected in the SINR (there is in fact a slight increase (decrease) in the SINR, which can be neglected under high SNR conditions, $\eta \ll \Sigma_{k \in I_i} P_k g_{ki}$). Finally, when the frame length of the interfering nodes is increased (decreased), the SINR increases (decreases). On the other hand, when the interfering nodes increase (decrease) their number of occupied subcarriers, the SINR decreases (increases), since the probability of subcarrier collision increases (decreases).

As can be observed in (14), modulation and FEC coding rate do not affect the average SNR measured at the receiver. Instead, these two parameters affect the relation between bit-error-rate (BER) experienced at the receiver and SINR. Lower FEC coding rate means more overhead symbols, which potentially lower the BER after decoding. Thus, for a given minimum BER threshold, lower FEC coding rates require lower minimum SINR. On the other end, for a given BER requirement, increasing the modulation order requires a higher minimum SINR level to achieve that BER. For these reasons, the minimum SINR requirement, i.e., $SINR_{min}$, is expressed as a function of the FEC coding rate and the modulation order, i.e., $SINR_{min}(r_c, M)$.

3. MAC and Rate Adaptation

In some embodiments, U-OFDM medium access control protocol and rate adaptation schemes can be provided. Based on the discussion so far, there is a tradeoff between (i) resilience to interference and channel errors, (ii) achievable information rate, and (iii) energy efficiency. Thus, medium access control and rate adaptation strategies can be provided that find optimal operating points along efficiency-reliability tradeoffs. Rate-maximizing adaptation strategies are discussed in Section 3.1. Energy-minimizing strategies are discussed in Section 3.2.

3.1 Distributed Rate-Maximizing Adaptation

The objective of the rate-adaptation scheme under consideration is to let each active communication maximize its transmission rate by optimally selecting the instantaneous power, the number of occupied subcarrier, the time-hopping frame length, the FEC coding rate and modulation, based on the current level of interference and channel quality measured at the receiver and on the level of interference generated by the transmitter to the other ongoing communications. A decentralized ultrasonic intra-body area network is considered, with $\mathcal{N}$ being the set of $|\mathcal{N}|$ existing connections. Note that there are no predefined constraints on the number of simultaneous connections $|\mathcal{N}|$. Denote by $N_{h,max}, r_{c,max}, M_{max}$ and $P_{max}$, the maximum time-hopping frame length, the maximum coding rate, the maximum modulation rate and the maximum instantaneous power supported, respectively. Thus $$0 < N_{f,i} \leq N_{f,max}, \forall i \in \mathcal{N}, N_i \in \mathbb{N}, \quad (15)$$

$$0 < N_{h,i} \leq N_{h,max}, \forall i \in \mathcal{N}, N_i \in \mathbb{N}, \quad (16)$$

$$r_{c,i} \in \{r_{c,1}, r_{c,2}, \ldots, r_{c,max}\} \forall i \in \mathcal{N}, \quad (17)$$

$$M_i \in \{M1, M2, \ldots, Mmax\} \forall i \in \mathcal{N}, \quad (18)$$

$$0 \geq P_i \leq P_{max} \forall i \in \mathcal{N}, \quad (19)$$

where $\mathbb{N}$ is the set of natural numbers. According to the transmission scheme discussed in Section 2, each node i transmits at a rate $R^{(i)}$ expressed as in (12) and each receiver experiences an SINR expressed as in (14). Each node has a minimum data rate requirement, $$R_i(N_{f,i}, N_{h,i}, r_{c,i}, M_i) \geq R_{min}, \quad (20)$$

and a minimum SINR requirement, $$SINR_i(P_i, N_{f,i}, N_{h,i}) \geq SINR_{min}(r_{c,i}, M_i) \quad (21)$$

The receiver is in charge of estimating interference and finding the instantaneous power, number of occupied subcarriers, time-hopping frame length, FEC coding rate and modulation that maximize the system performance. Accordingly, denote instantaneous power, the number of occupied subcarrier, the time-hopping frame length, the FEC coding rate and modulation selected by the receiver of the connection r, as $P_r, N_{f,r}, N_{h,r}, r_{c,r}, M_r$.

The objective of each user is to locally optimize the information rate of the connection by solving the following problem:

$$\text{find } P_r, N_{f,r}, N_{h,r}, r_{c,r}, M_r \quad (22)$$

$$\text{that maximize } R_r, (N_{f,r}, N_{h,r}, r_{c,r}, M_r) \quad (23)$$

$$\text{subject to } R_r, (N_{f,r}, N_{h,r}, r_{c,r}, M_r) \geq R_{min} \quad (24)$$

$$SINR_r(P_r, N_{f,r}, N_{h,r}) \geq SINR_{r,min}(r_{c,r}, M_r) \quad (25)$$

$$SINR_i(P_i, N_{f,i}, N_{h,i}) \geq SINR_{i,min}(r_{c,i}, M_i) \; \forall i \in \mathcal{J}_r, \quad (26)$$

where $\mathcal{J}_r$ is the set of the connections interfering with the $r^{th}$ connection. The constraints on the maximum frame and code length in (15), (16), (17), (18) and (19) are also implicitly considered.

3.2 Distributed Energy-Minimizing Rate Adaptation

Rate adaptation has the objective of reducing the energy consumption of U-OFDM. Section 2 mentioned that adaptive frequency and time hopping techniques, adaptive FEC coding and adaptive modulation affect the energy consumption of the transmitting device. For this reason, energy-related metrics are introduced that make the dependence of the energy consumption on number of occupied subcarriers, time-hopping frame length, FEC coding and modulation explicit.

$E_b$, the energy per bit is defined as:

$$E_b = P \cdot T_c / (r_c \cdot N_f \log_2(M)) \quad (27)$$

$E_s$, the average power radiated per second is defined as:

$$E_s = P/(N_h). \quad (28)$$

The energy per bit is a function of the inverse of the FEC coding rate, number of occupied subcarriers and number of bits transmitted per symbol. Higher coding rate, number of occupied subcarrier and modulation order decrease the energy consumption. The average power emitted per second is a function of the inverse of the time-hopping frame length and hence of the number of OFDM blocks transmitted per second.

Energy-minimizing Rate Adaptation. Based on this model, a rate adaptation strategy is provided where the objective is to minimize (i) the energy per bit, $E_b$, or (ii) the average energy emitted per second $E_s$. The problem can be cast as finding the optimal frame length and the optimal spreading code length that minimize $E_b$ (and/or $E_s$) while meeting the minimum SINR constraints and keeping the data rate over a given threshold. The problem is formally expressed below.

Find $P_r, N_{f,r}, N_{h,r}, r_{c,r}, M_r$,
that minimizes $E_b(P_r, r_{c,r}, N_{71,r}, M_r)$ (or $E_s(N_{h,r})$)
subject to Equations (24), (25) and (26).

3.3 Medium Access Control Protocol

In some embodiments of U-OFDM, distributed medium access control coordination can be achieved by exchanging information on logical control channels, while data packets are transmitted over logical data channels. Unicast transmissions between a transmitter TX and a receiver RX are considered, as follows.

When TX needs to transmit a packet, it first needs to reserve a dedicated channel to RX. The connection is opened through the common control channel using a two-way handshake procedure. In U-OFDM the control channel can be implemented using two different alternative approaches, fixed control channel and random control channel. In the fixed control channel approach, a fixed number of preassigned subcarriers are allocated to transmit and receive control information. In the control subcarriers the communication follows a unique time-hopping sequence known and shared by all network devices. All the nodes listen to the fixed control channel and wait for a request from a transmitting node. The control channel is accessed through a contention phase.

In the random control channel approach, control channel is implemented in a frequency-hopping fashion, i.e., the control channel subcarrier allocation changes pseudo-randomly in time. Synchronization between the transmitting and receiving nodes is possible by guaranteeing that the transmitter use all the channels in a fixed period of time, so that the receiver can then find the transmitter channel by picking a random channel and listening for valid data on that channel.

In the two-way handshake procedure, TX sends a Request-to-Transmit (R2T) packet to RX, which contains its own ID. If RX is idle, a Clear-to-Transmit (C2T) control packet is sent back to TX. In case of failure and consequent timer expiration, TX will attempt a new transmission after a random backoff time, for a maximum of $N_R$ times. After receiving the C2T packet, the transmitter switches to a dedicated channel by computing its own frequency- and time-hopping sequence by seeding a pseudo-random sequence generator with its own ID. As a consequence, both TX and RX leave the common channel and switch to a dedicated channel. The receiver RX computes the optimal transmission strategy, i.e., number of occupied subcarrier, time-hopping frame length, FEC coding rate and modulation, as discussed in Section 2. This information is piggybacked into ACK or NACK packets.

Once the communication has been established, RX does not leave the common control channel. Instead, it keeps "listening" to both the dedicated and common control channels at the same time. In the dedicated control channel, RX sends to TX the optimal strategy information to be used for the next transmission. In the common control channel, RX exchanges with other co-located receivers information on the level of tolerable interference.

3.4 Network Configuration

U-OFDM can internetwork implantable devices in master/slave (M/S) or peer-to-peer (P2P) configurations. Both configurations can coexist in the same intra-body network, referred to as hybrid configurations.

Master-Slave Configuration. In the M/S configuration, one node takes the role of master, i.e., network coordinator, while the remaining nodes operate as slaves. In this scenario, the network control is concentrated on a master node. Network access of the slave node is deterministically regulated through a polling mechanism, e.g., the master node has complete control over channel access, while each slave node is granted access to the medium in a round-robin fashion.

Peer-to-Peer Configuration. In the P2P configuration, all the network nodes are treated as peers. In this configuration, network access can be regulated as discussed in Section 3.3 through fixed or random control channel.

Figure 3:
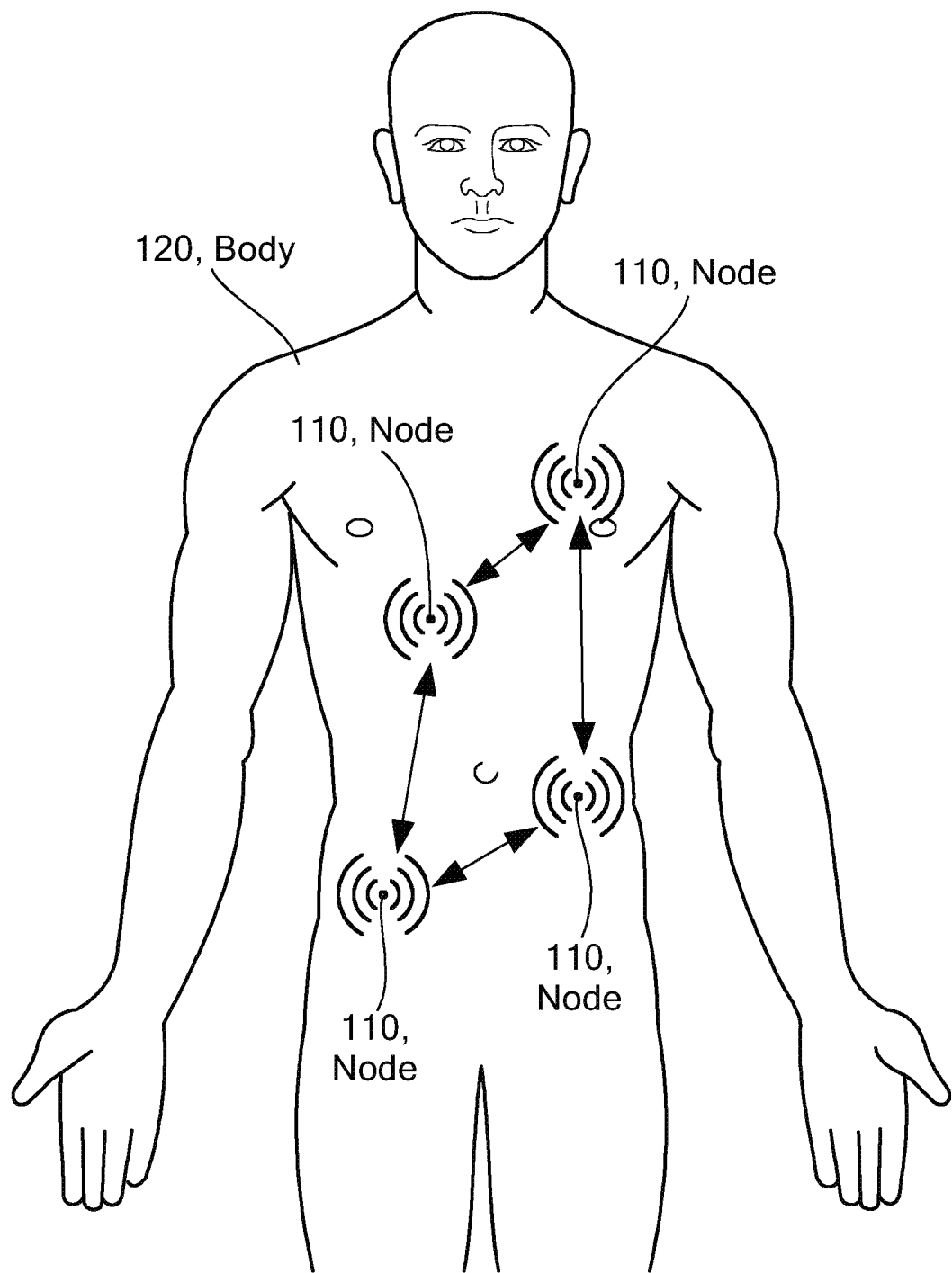
FIG. 3 is a schematic illustration of a network of nodes implanted in a body.

The communication system and method for transmitting data ultrasonically through biological tissue can be advantageously implemented among a network comprising a plurality of nodes 110 in which at least a portion of the nodes are implantable within a body 120. See FIG. 3. In some embodiments, at least one of the implantable nodes, a first node, comprises an ultrasonic transducer and a transmitter, and a second node, which can be implantable within the body or disposable outside the body, comprises an ultrasonic receiver. The transmitter at the first node includes an orthogonal frequency division multiplex (OFDM) signal generator operative to encode an input information bit stream on orthogonal subcarriers for transmission as an ultrasonic signal through the body to the ultrasonic receiver at the second node. The ultrasonic receiver at the second node is operative to decode the ultrasonic signal received from the first node to recover the information bit stream. In some embodiments, all of the nodes are implantable in a body. In some embodiments, the nodes are operable to support an ultrasonic communication data rate of at least 28 Mbit/s. A data rate greater than 28 Mbit/s is particularly suitable for ultrasonic communications in intra-body networks for applications such as neural data recording or wireless endoscopic pills.

Each node can include a combination of hardware, software, and/or firmware that allows the system to perform the various tasks as described herein. The nodes can be implemented as microprocessor-based computing devices, microcontroller-based computing devices, and the like. The computing devices can include one or more processors and memory that cooperate with an operating system to provide basic and support functionality for an applications layer and other processing tasks. Various types of processing technology can be used, including a single processor or multiple processors, a central processing unit (CPU), multicore processors, parallel processors, or distributed processors. Additional specialized processing resources, such as mathematical processing capabilities, can be provided to perform certain processing tasks. Other hardware components and devices can interface with the computing device. As used herein, the term "transceiver" can include one or more devices that both transmit and receive signals, whether sharing common circuitry, housing, or a circuit board, or whether distributed over separated circuitry, housings, or circuit boards, and can include a transmitter-receiver.

The computing device includes memory or storage, which can be accessed by a system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as memory chips and memristor memory cells. Any other type of tangible, non-transitory storage that can provide instructions and/or data to a processor can be used in these embodiments.

The communication system and method can be used in a variety of applications that require transmission of data through biological tissue. For example, the system and method can be used with implantable sensors, such as cardiac rhythm monitors, pulse monitors, blood pressure sensors, glucose sensors, drug pump monitors, neurological sensors, motion sensors, gyroscopes, accelerometers, sleep sensors, REM sleep duration sensors, still cameras, or video cameras, to transmit physiological data that is captured by the implantable sensors to a gateway outside of the body or to other implanted devices within the body. The system can be used to communicate actuation commands to and obtain data from implantable devices such as drug delivery systems or drug pumps, heart stimulators, pacemakers, neuromuscular electrical stimulators, and bone growth stimulators. For example, the system and method can be used to obtain data from a glucose monitor in a diabetic patient and to communicate instructions to and obtain data from a miniaturized, under-the-skin insulin pump. As another example, the system and method can be used with pill-sized ingestible cameras that are used to monitor the digestive tract of a patient. In some embodiments, the system and method can implemented as an endoscopic pill. The system can be used with a human body or with a non-human animal body.

In certain embodiments, a node can include a sensor for one or more biomolecules. Examples of such biomolecules include peptides, oligopeptides, polypeptides, proteins, glycoproteins, antibodies, antigens, nucleic acids, nucleotides, oligonucleotides, polynucleotides, sugars, disaccharides, trisaccharides, oligosaccharides, polysaccharides, lipids, glycolipids, proteolipids, cytokines, hormones, neurotransmitters, metabolites, glycosaminoglycans, and proteoglycans. In certain embodiments, a node can include a sensor for one or more pharmaceutical agents or pharmaceutical formulation ingredients. In certain embodiments a node can include a sensor for a dissolved gas or ion, or for pH, ionic strength, or osmolarity.

EXAMPLES

An OFDM signaling scheme for intra-body ultrasonic communications was prototyped and tested to determine achievable data rates through synthetic phantoms mimicking the ultrasonic propagation characteristics of biological tissues. In a first set of experiments, the focus was on realizing real-time implementation of the OFDM physical layer and evaluating its performance in terms of BER for different transmission power levels. In a second set of experiments, the focus was on maximizing the data rate of the proposed scheme and evaluating results with offline processing.

Example 1

An OFDM signaling scheme was designed using a packet format having N consecutive OFDM blocks. To reduce the effect of multipath delay spread, a zero-padding (ZP) technique was used, which is based on padding zeros after each OFDM block to act as a guard interval. ZP was chosen over other alternatives such as cyclic-prefixing (CP) because of its energy-efficiency. In the proposed packet format, each OFDM block was designed to have K subcarriers, which were assigned with three different roles: (i) $K_D$ subcarriers were designated as data subcarriers for allocating data symbols, where each data symbol was a modulated version of information bits with different gray-coded modulation schemes (i.e., Binary-Phase-Shift-Keying (BPSK), Quadrature-Phase-Shift-Keying (QPSK), 8-PSK, 8-Quadrature-Amplitude-Modulation (8-QAM), 16-QAM, 32-QAM, 64-QAM, 128-QAM); (ii) $K_P$ subcarriers were charged as pilot subcarriers for carrying symbols that were known both by the transmitter and the receiver. Pilot subcarriers were equally spaced within the OFDM block and carried symbols that were mapped with BPSK for decreasing the complexity of the receiver algorithms. The pilot subcarriers were exploited for performing channel estimation, block-level (fine) synchronization, and supporting Doppler scale estimation; (iii) $K_N$ null subcarriers were assigned to be used for Doppler scale estimation. Moreover, the packet format included a preamble, i.e., Pseudorandom-Noise (PN) sequence, preceding each packet for using in packet detection and coarse-synchronization operations.

Figure 4:
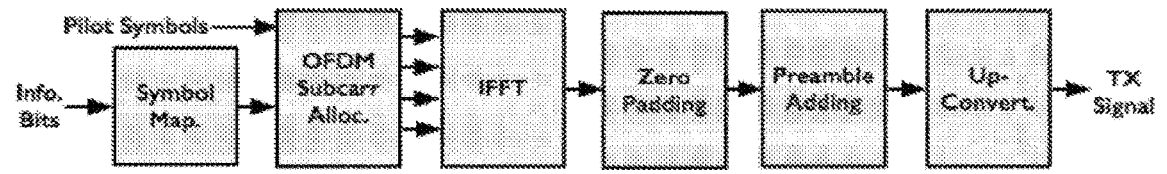
FIG. 4 is a block diagram of a prototype ZP-OFDM transmitter (top) and receiver (bottom)
Figure 4:
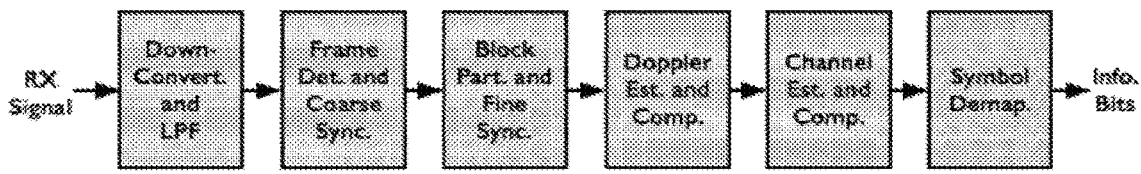

FIG. 4 illustrates a block diagram of the prototyped OFDM scheme. At the transmitter side, the information bits were mapped into symbols based on the selected modulation scheme. The generated serial symbol stream was then converted into a parallel stream in accordance with the subcarrier positions along with pilot and null symbols. Consequently, the parallel stream was fed into an IFFT block, which output the symbol representations in the time domain as a serial stream. Later on, the zero-padding operation was performed to generate ZP-OFDM blocks. The formed ZP-OFDM blocks were fed into an operational block, where they were transformed into the packet format with the addition of a preamble block. Finally, the resulting stream was up-converted to the carrier frequency and transmitted. At the receiver side, first the received signal was down-converted to baseband and a low-pass filter (LPF) was used for filtering out the out-of-band noise and interference. The filtered baseband signals were then fed into synchronization blocks, where the correlation properties of the PN sequence were exploited to perform frame detection and coarse-synchronization. Following the coarse-synchronization, the OFDM frame was partitioned into individual OFDM blocks by performing the block-level synchronization by using the pilot symbols. The partitioned OFDM blocks were then converted into parallel streams to be fed into the FFT block, where they were converted to serial streams in the frequency domain. Later on, the frequency domain streams were passed to a block, where the Doppler scale was estimated and compensated accordingly. The Doppler-compensated OFDM blocks were fed into a channel estimation block, which performed pilot-tone based channel estimation and channel equalization. Finally, a receiver block that incorporated a Zero-Forcing receiver mapped equalized symbols onto the bits.

Example 2

Figure 5:
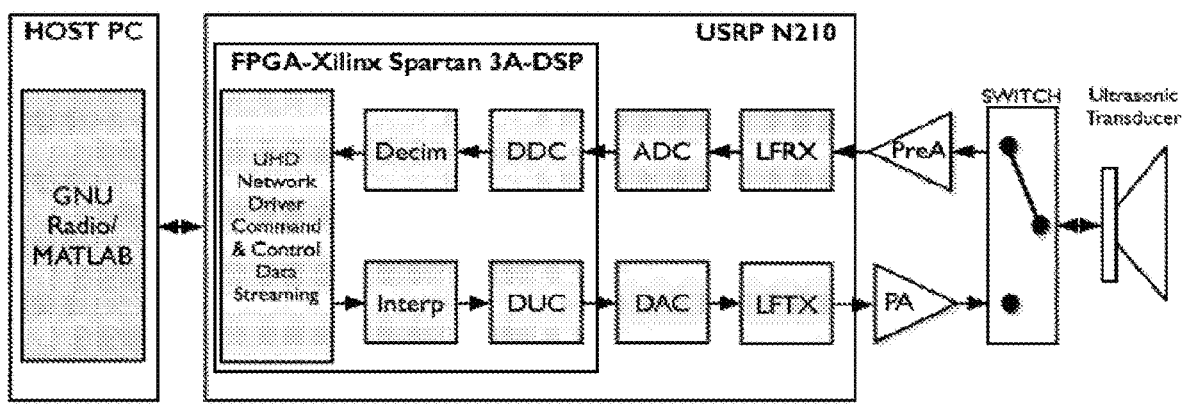
FIG. 5 is a schematic diagram of hardware architecture of a prototype SDR-based node.

A custom software-based radio (SDR) -based node for testing ultrasonic communication schemes was designed and used. The testbed included two of these SDR-based nodes, which supported an ultrasonic communication link through an ultrasonic phantom that mimicked the acoustic propagation properties of biological tissues with high fidelity. The custom SDR-based nodes included (i) a USRP N210, (ii) a host Linux-PC, (iii) a power amplifier/a voltage preamplifier, (iv) an electronic switch, and (v) an ultrasonic transducer. FIG. 5 depicts the hardware architecture of the node.

A Universal Software Radio Peripheral, USRP N210, a Field Programmable Gate Array (FPGA) based, SDR platform, commercially available from Ettus Research, was selected due to its low cost and wide adoption in academia and industry. The USRP N210 included a motherboard and two daughterboards. Specifically in the node design, LFTX and LFRX daughterboards were selected, which covered a frequency band of (DC –30 MHz) that enabled a half-duplex transceiver operating in the ultrasonic frequency ranges of interest for this application. The motherboard acted as the main processing unit, which was equipped with an analog-to-digital-converter (a dual 100 MS/s 14-bit ADC) and a digital-to-analog-converter (a dual 400 MS/s 16-bit DAC), that were both controlled by a 100 MHz master clock, and an FPGA unit (Xilinx Spartan 3A-DSP3400). The sampling rate of incoming digital samples (from ADC) and outgoing samples (to DAC) was fixed at 100 MS/s, while the FPGA digitally interpolated/decimated the sample stream to match the hardware sampling rate to the rate requested by the user. In USRP, high rate baseband signal processing is typically performed in a host-PC that is connected to the USRP through a Gigabit Ethernet (GigE) connection or in the FPGA.

The host machine was the processing unit that typically handled high rate baseband signal processing functionality. It can be either a desktop/laptop computer or a computer-on-module, e.g., Gumstix, Raspberry Pi. To implement signal processing functionalities, open source GNU Radio was used to implement the software radio. GNU Radio was used (i) to drive the USRP operations from the host-PC, (ii) as well as to implement signal processing operations in combination with MATLAB scripting language. GNU Radio provided a plethora of signal processing blocks that are implemented in C++ and that can be leveraged to rapidly implement a wide range of wireless communication schemes. In the testbed, the GNU Radio framework was selected because of its large set of available building blocks and because of the capability of creating new custom blocks easily for implementing customized communication schemes. Also, the receiver functionalities of GNU Radio blocks and MATLAB scripting language were combined for experiments.

The testbed used amplifiers to enhance the communication range and performance of the ultrasonic link. At the transmitter side, a COTS power amplifier (PA), LZY-22+, available from Mini-Circuits, was used. This PA was capable of providing a gain of 43 dB across the operating frequency of 0.1 to 200 MHz and leveraged to amplify the output power of the LFTX daughterboard (i.e., 2 mW). At the receiver side, a COTS Low-Noise Amplifier (LNA), ZFL-1000LN+, available from Mini-Circuits, was used. This LNA offered a low-noise figure of 2.9 dB. To enable full-duplex operations with a single ultrasonic transducer on a time division basis, the node design incorporated a COTS electronic switch, ZX80-DR230+, available from Mini-Circuits, which offered a low insertion loss with a very high isolation over the frequency range of 0 to 3 GHz. The electronic switch was driven by leveraging the General Purpose Input/Output (GPIO) digital pins available on the LFTX and LFRX daughterboards.

Ultrasonic transducers were used that were capable of generating and detecting ultrasonic waves over a range of frequencies of interest to this application. Typically, ultrasonic transducers are based on the piezoelectric effect, which enables two-way conversion between electrical and ultrasonic energy. The main factor in determining the ultrasonic transducer to be used in the system was the operating frequency. As noted above, while increasing the operating frequency allows the size of the transducer to be decreased, this results in higher signal attenuation. Therefore, to be able to operate over the links on the order of several cm, the operating frequency should not exceed 10 MHz. Moreover, most biomedical sensing applications require directional transducers. Considering these factors, small-size directional ultrasonic transducers were selected that were able to support lowest possible frequencies and large signal bandwidths. Hence, standard immersion ultrasonic transducers, Ultran WS37-5, available from The Ultran Group, were used. These transducers offered approximately a nominal bandwidth of 5 kHz at the central frequency of 5 kHz.

Example 3

To emulate the intra-body ultrasonic communication channel with high fidelity, ultrasonic phantoms were used. The ultrasonic phantoms were tissue-mimicking materials (tissue substitutes) that had the same acoustic propagation characteristics of human tissues, e.g., sound speed, density, and attenuation. The testbed was based on an off-the-shelf human-kidney phantom, available from Computerized Imaging Reference Systems, Inc., immersed in a background water-based gel that had dimensions of 10 cm×16 cm×20 cm The background gel had the same density and sound speed as the kidney, which minimized the possible reflections and retractions and accordingly can be considered acoustically transparent. The acoustic characteristics of the phantom are summarized in Table 1.

TABLE 1

| Acoustic Characteristics of the Ultrasonic Phantom | | | |
|---|---|---|---|
| Tissue | Speed, v | Attenuation, α | Density, ρ |
| Background Gel | 1550 m/s | <0.1 dB/cm | 1020 Kg/m$^3$ |
| Kidney | 1550 m/s | 2 dB/cm @ 5 MHz | 1030 Kg/m$^3$ |

Figure 6:
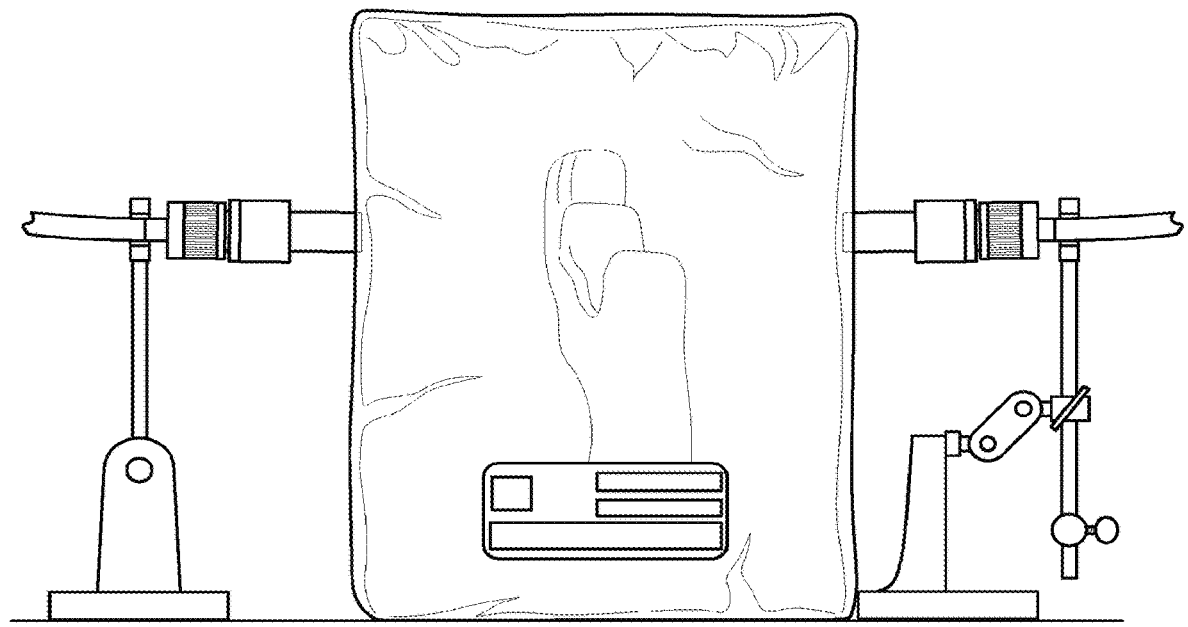
FIG. 6 is an illustration of SDR-based ultrasonic nodes communicating through a human-kidney phantom.
Figure 7:
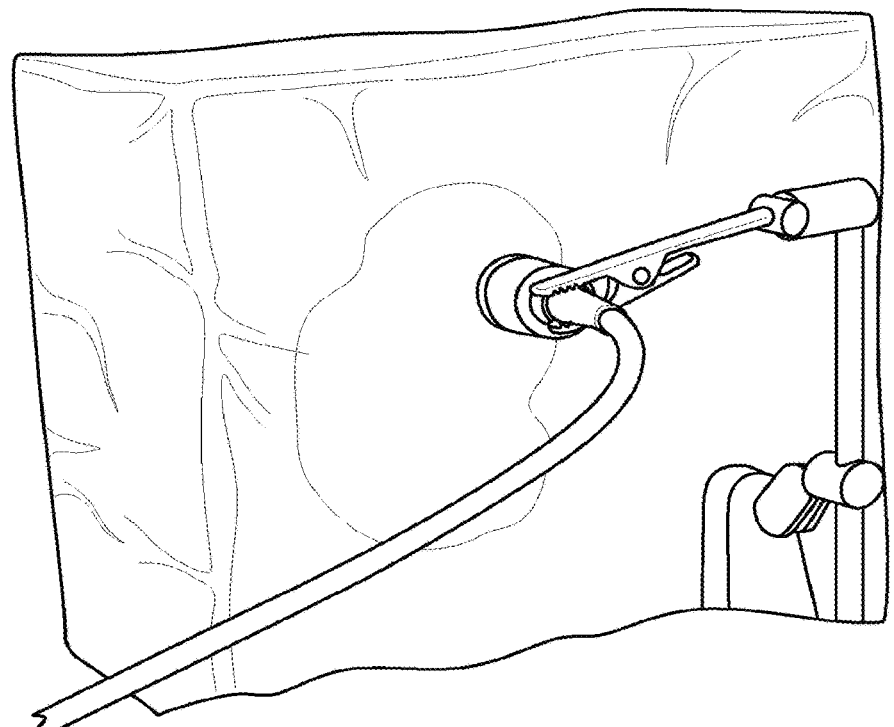
FIG. 7 is a further illustration of SDR-based ultrasonic nodes communicating through a human-kidney phantom.

FIGS. 6 and 7 illustrate a testbed setup with two SDR-based ultrasonic nodes communicating through a human-kidney phantom.

Example 4

A first set of experiments was aimed at achieving a real-time implementation of the communication scheme described in Example 1 and using the testbed setup of Examples 1-3 and FIGS. 6 and 7. To obtain this, all the processing blocks using GNU Radio on the host machine were designed and implemented. However, the sampling rate and accordingly the data rate of this implementation were limited by two main factors: (i) the link capacity of the GigE connection between the host machine and the USRP that limited the maximum achievable sampling rate, i.e., 25 MS/s. When this sampling rate was exceeded, the GigE connection started experiencing network packet drops that caused loss of digital samples; and (ii) purely software implementations (GNU Radio) of digital signal processing blocks introduced high processing latency, which eventually overloaded the host machine when operating at high sampling rates, i.e., typically greater than 10 MS/s. Therefore, if the host machine were not capable of processing the data as fast as the sampling rate, the internal buffers that stored digital samples overflowed and caused loss of digital samples.

To overcome this limitation, considering the processing time of the implementation, the sampling rate was limited to 781 kS/s, which corresponded to a bandwidth of 390 kHz. A carrier frequency of 5 MHz was used, which matched with the center frequency of the ultrasonic transducers. A packet structure was defined that incorporated 32 OFDM blocks, each of them including 2048 total number of subcarriers and 128 pilot subcarriers. Each data subcarrier carried an information symbol that was mapped either with BPSK, QPSK, 8QAM, 16QAM. As a note, specifically for this set of experiments, the power amplifier was not incorporated in the testbed setup.

Figure 8:
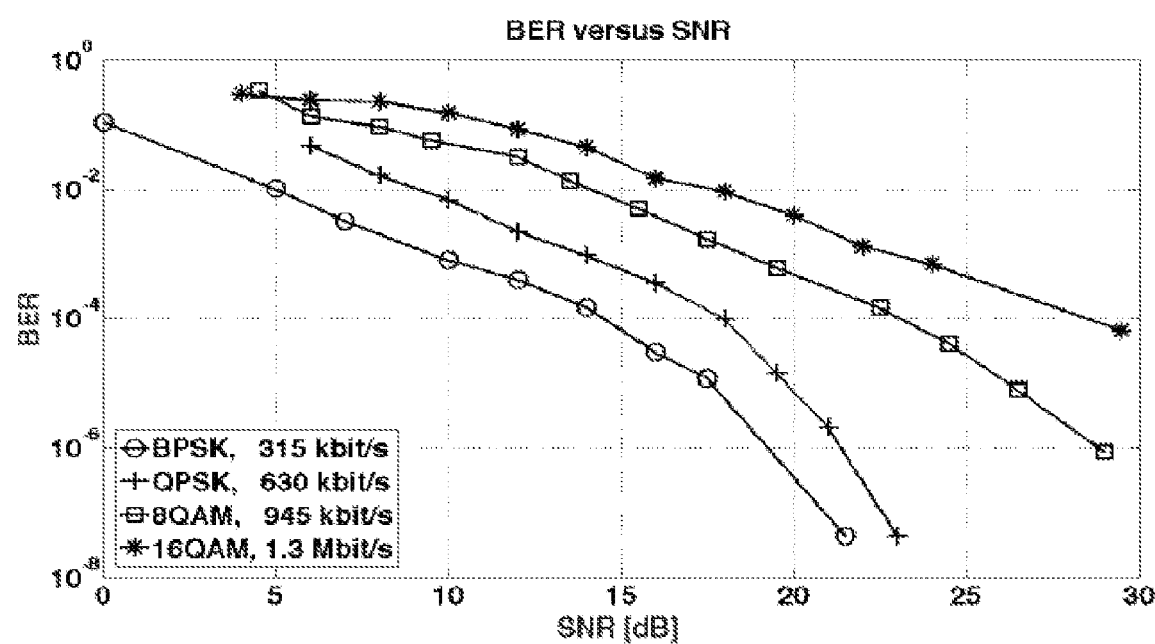
FIG. 8 is a graph of BER versus SNR results for different modulation schemes.

FIG. 8 shows BER versus SNR performance for different modulation schemes and accordingly different data rates. Using a higher modulation scheme increased the data rate at the expense of BER performance. The ultrasonic communication scheme was able to support data rates up to 1.3 Mbit/s at BER lower than $10^{-4}$ with real-time processing on the host machine.

Example 5

In a second set of experiments, the objective was to maximize the data rate of the ultrasonic communication scheme over the testbed setup. As explained in Example 4, a purely software implementation (GNU Radio) of the communication scheme limits the maximum data rate that can be reached. While it is possible to overcome this limitation by migrating software processing from the host machine to the FPGA to effectively speed up data processing and reduce the computational load on the host machine, such an approach was beyond the scope of this set of experiments. To that end, offline experiments were performed, in which GNU Radio was used only for recording the transmitted data while processing it offline with MATLAB.

The sampling rate was increased to 10 MS/s, which translated into a bandwidth of 5 MHz. Similar to the previous set of experiments, a carrier frequency of 5 MHz was used. A packet structure was used that included 32 OFDM blocks. Each of them had 32768 total number subcarriers and 2048 pilot sub-carriers. Each data subcarrier conveyed an information symbol that was mapped with higher order modulation schemes, i.e., 8QAM, 16QAM, 32QAM, 64QAM, 128QAM.

Table 2 shows BER versus SNR performance for different modulation schemes and accordingly different data rates. Data rates of 28.12 Mbit/s were reached with a BER performance of $10^{-1}$ while data rates up to 20.15 Mbit/s were achievable with a BER lower than $3 \times 10^{-2}$. As a note, in this specific set of experiments, forward-error-correction (FEC) coding, e.g., convolutional codes, that can trade off BER performance for data rate, were not considered.

TABLE 2

BER versus SNR Results for Different Modulation Schemes

| Modulation | BER v | SNR [dB] | Data Rate [Mbit/s] |
|---|---|---|---|
| 8QAM | $1.9 \times 10^{-4}$ | 17 | 12.09 |
| 16QAM | $5.8 \times 10^{-3}$ | 18 | 16.12 |
| 32QAM | $3.1 \times 10^{-2}$ | 13 | 20.15 |
| 64QAM | $8.0 \times 10^{-2}$ | 19 | 24.18 |
| 128QAM | $1.3 \times 10^{-1}$ | 20 | 28.12 |

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A system for transmitting data ultrasonically through a network: the network comprising a plurality of nodes, at least a portion of the nodes in communication through an aqueous medium, including: a first node embedded within and communicating through the aqueous medium and comprising an ultrasonic transducer and a transmitter, and a second node comprising an ultrasonic receiver; the transmitter at the first node including an orthogonal frequency division multiplexing (OFDM) signal generator operative to encode an input information bit stream on orthogonal sub-carriers for transmission as an ultrasonic signal through the aqueous medium to the ultrasonic receiver at the second node, wherein OFDM packets carrying information bits are preceded by a preamble to provide a starting point of a packet to perform time synchronization; and the ultrasonic receiver at the second node is operative to decode the ultrasonic signal received from the first node to recover the information bit, further comprising a medium-access control layer for multipoint communication.

2. The system of claim 1, wherein the OFDM signal generator is further operative to generate Doppler compensated blocks.

* * * * *